Dec. 11, 1923.
J. D. GIBBS
FRICTION GEARING
Filed Sept. 14, 1922
1,477,052
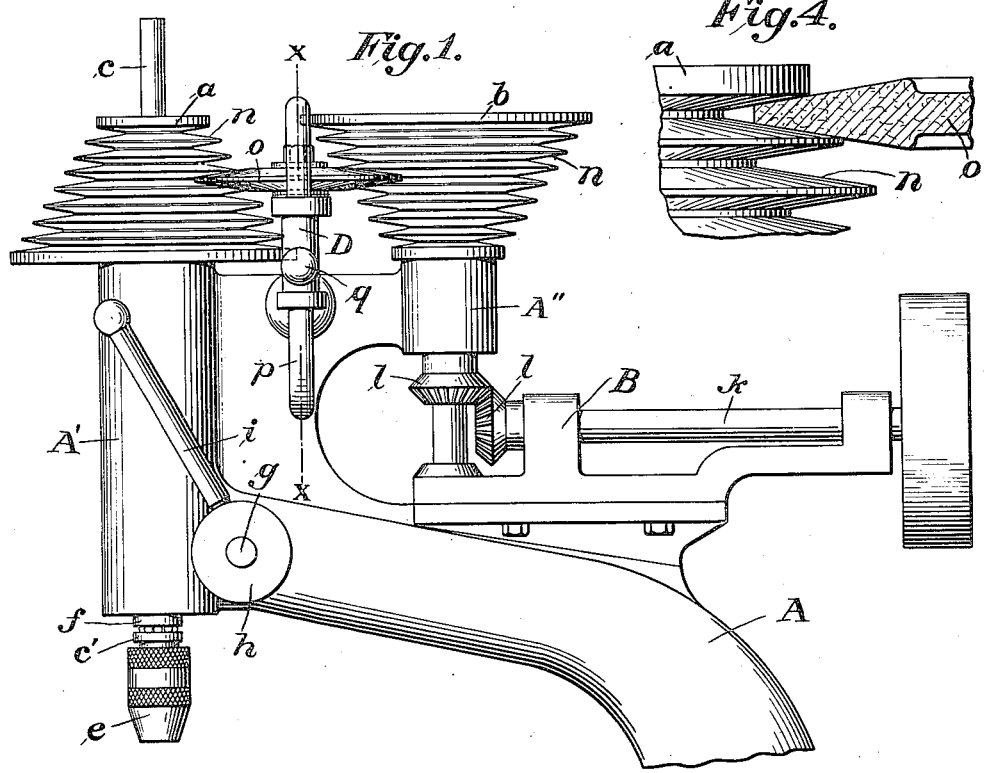
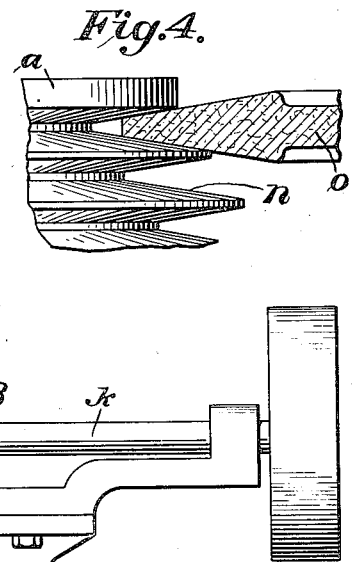
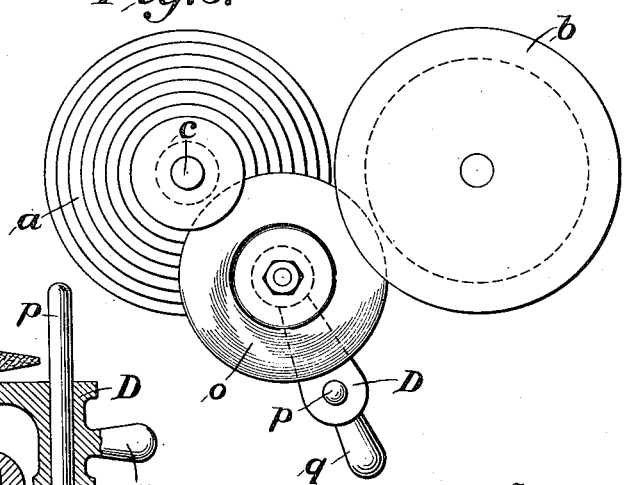
Inventor:
James D. Gibbs,
By
Attorneys Patented Dec. 11, 1923.                                              1,477,052

UNITED STATES PATENT OFFICE.

JAMES D. GIBBS, OF LOUISVILLE, KENTUCKY.

FRICTION GEARING.

Continuation of application filed January 29, 1921, Serial No. 440,968. This application filed September 14, 1922. Serial No. 588,264.

*To all whom it may concern:*

Be it known that I, JAMES D. GIBBS, a citizen of the United States, and resident of Louisville, in the county of Jefferson and State of Kentucky, have invented certain new and useful Improvements in Friction Gearing, of which the following is a specification.

This application is a continuation of an application filed by me on the 29th day of January, 1921, Serial No. 440,968.

My invention relates to friction gearing and is shown and described herein as embodied in speed control mechanism designed more especially for what is commonly known as sensitive drills, in the operation of which the exact effect or action of the drill upon the metal being perforated is communicated to the operator through the hand and arm, thus serving as a guide as to the amount of pressure and speed that can safely be applied, but applicable also to lathes and many other devices.

The invention aims to provide a friction gearing which will be economical of construction, non-slipping in its action, durable in use, and capable of being easily manipulated.

An embodiment of my invention is illustrated in the accompanying drawings, in which:—

Figure 1 is a side elevation of the pertinent portion of a drill press embodying my invention.

Fig. 2 is a front view sectioned on broken line *x—x*.

Fig. 3 is a plan view of the speed control mechanism.

Fig. 4 is an enlarged portion of cone-wheel and communicating disc fully meshed.

Similar parts are indicated by identical letters in the several views.

The general form of the main frame A may be similar to that of the ordinary bench-drill except that in addition to the bearing or housing A', for the drill spindle *c*, it is provided with an additional bearing A'', for the vertical shaft *d*, (the latter being parallel with the drill spindle *c*), and the bearing plate B for the horizontal shaft *h* which is connected with and imparts motion to vertical shaft *d* by means of the mitre-gears 1—1.

In point of construction, the drill spindle and its related parts are not different from those commonly in use, viz; the main housing A', the key-seated spindle *c* with its thrust bearing *c'*, the vertically moving sleeve *f* having its rack within the housing, the shaft *g* with its feed disc *h*, detachable handle *i*, and internal gear meshing with rack on the sleeve *f*, and, lastly, the chuck *e* for attaching the drills of any desired size.

Instead of an ordinary pulley or wheel being mounted on the spindle *c*, I employ a cone-shaped pulley *a*, having a series of V-shaped grooves *n n*, of varying diameters, progressing from the smallest to the largest diameter in exactly even steps and, on the parallel vertical shaft *d*, an identical grooved pulley or wheel *b*, but having its large and small diameters in reverse position to that of pulley or wheel *a*. Mounted between the two grooved pulleys or wheels on the stud *p*, having its bearing in sleeve C, and exerting an inward pressure by means of spring *s*, is the sliding arm D, upon which is carried a beveled edge disc or wheel *o*, which is adjustably adapted to contact with the corresponding grooves of the cone-wheels *a* and *b*, thereby communicating the motion to the drill in any degree of speed desired.

I have found that two factors are necessary to a successful friction gear of the type in which a wedge shaped or beveled edged friction wheel cooperates with a correspondingly grooved wheel. One is that the coacting walls must be steeply inclined, and the other that the peripheral edge of the beveled edged wheel must at no time contact with the bottom of the co-acting groove.

The inclination which I have found most effective is that shown in the drawings, to wit, approximately 18°, and the proportions are such that a material space is left between the periphery of the beveled edged wheel and the bottoms of the grooves, so that there is no rolling contact, but only a wedging action.

The several parts of my speed control mechanism may be constructed of any suitable material, preferably cast iron for the grooved cone-pulleys or wheels and papier-mâché or fibre for the beveled edged wheel *o*. Obviously the material for the disc should be somewhat softer than that of the cone-pulleys or wheels and although fibre has proven to possess the necessary qualities of tenacity and durability, any other material having in sufficient degree the same qualities may be successfully applied.

It will be observed that the arm D upon which the beveled edged wheel o, is mounted, slides up and down on the curved stud p, one end of which is rigidly connected with the plunger m, which has its bearing in the sleeve C. The tubular plunger m, has its free end plugged and a spiral spring s, with in it, as shown. The pin r passes through slots in the top and bottom walls of the plunger providing an estoppel for the spring s and serving to retain the stud p, in a vertical position.

In practical use, the operator seizes the handle q, pulls out the spring-pressed plunger m, raises or lowers the arm D, until the edge of beveled edged wheel o is directly opposite the desired groove, then relaxes the strength of his pull upon the handle whereupon the spring s causes the plunger to recede forcing the beveled edged wheel into firm contact with the adjacent grooves of the two cone-wheels. To provide lateral movement to the beveled edged wheel, in order that it may have equally firm contact with both of the cone-wheels, the arm D has a free rotating movement upon the stud p, thus automatically adjusting the beveled edged wheel to any pair of the grooves. This is best illustrated in Fig. 3.

What I claim is:—

1. A variable speed mechanism comprising two reversely placed multi-grooved cone wheels journaled on parallel axes, the grooves of said wheels being of narrow V-shape in cross section, and an idle wheel of softer material, having a periphery of narrow reversed V-shape in cross section, the walls of the grooves and idle wheel being so disposed that the idle wheel will be supported by the coacting grooves of the cone wheels with its peripheral edge spaced from the bottom of said grooves, and means for pressing said idle wheel towards and into contact with both of said cone wheels whereby it is entered into the grooves therein with a wedging action.

2. A variable speed mechanism comprising two reversely placed multi-grooved cone wheels journaled on parallel axes, a member mounted to have reciprocating motion towards and from a plane common to said axes, said member carrying a part extending parallel to said axes, a bracket arm slidably carried by said part and having a suitable operating handle, an idle wheel rotatably carried by said bracket arm, and adapted to engage the grooves of said cone wheels, and spring means acting on said slidable member to press the idle wheel towards the cone wheels.

3. In a variable speed mechanism, a support, parallel shafts journaled therein, reversely arranged grooved friction cone wheels fast on said shafts, said support having a passage substantially perpendicular to a plane passing through both said shafts, a tubular member slidably held in said passage and having lengthwise slots in its walls, a transverse pin passing through said slots and engaging the support, a spring within the tube and confined between said pin and tube end, a guide member carried by said tubular member and extending parallel to said parallel shafts, and an idle wheel slidably supported from said guide member.

4. A variable speed mechanism comprising two reversely placed multi-grooved cone wheels journaled on parallel axes, the grooves of said wheels being of narrow V-shape in cross section, and an idle wheel yieldingly and slidably mounted on a parallel shaft and having a peripheral edge of narrow reversed V-shape in cross section to correspond to the grooves in said cone wheel.

5. A variable speed mechanism comprising two reversely placed multi-grooved cone wheels journaled on parallel axes, the grooves of said wheels being of narrow V-shape in cross section, and an idle wheel yieldingly and slidably mounted on a parallel shaft and having a peripheral edge of narrow reversed V-shape in cross section to correspond to the grooves in said cone wheel, the walls of the grooves and cone wheel being so disposed that the idle wheel will be supported by the walls of the corresponding grooves with its peripheral edge spaced from the bottoms of the grooves.

6. In power transmission mechanism a wheel having a narrow V-shaped groove the walls of which are disposed at an angle to each other of not over 25°, and a coacting beveled edged wheel the walls of which are positioned at a corresponding angle, and means for rotatably supporting said wheels with the beveled edge of the latter meshing with the groove in the former.

7. In a power transmission mechanism, a suitably journaled wheel having a narrow V-shaped groove the walls of which are disposed at an angle of not over 25° and a suitably journaled beveled edged wheel having its beveled edges disposed at a corresponding angle, said last named wheel having its beveled edge engaging the groove in said first named wheel and its peripheral edge spaced from the bottom of the groove.

8. A power transmission mechanism comprising a wheel having a narrow V-shape groove and a correspondingly beveled wheel of softer material so disposed that its side surfaces contact with and are supported by the coacting side walls of the groove in the grooved wheel and having its peripheral edge spaced from the bottom of said groove, and means for pressing said beveled wheel into contact with said groove.

9. A power transmission mechanism comprising two correspondingly grooved wheels, the said grooves being of narrow V-shape with the respective walls of the grooves disposed at an angle to each other of substantially 18°, and an idle wheel of softer material having a periphery of narrow reversed V-shape in cross section with the walls thereof inclined to the same degree as the walls of said grooves so disposed that said walls of the idle pulley contact with and are supported by the coacting side walls of the grooved wheels, said idle pulley having its peripheral edge spaced from the bottoms of the grooves in said grooved wheels, and means for pressing said idle wheel into the grooves of said grooved wheels.

In testimony whereof, I affix my signature.

JAMES D. GIBBS.